United States Patent [19]
Marom

[11] Patent Number: 5,475,208
[45] Date of Patent: Dec. 12, 1995

[54] BARCODE SCANNER HAVING A DEAD ZONE REDUCING SYSTEM AND A MULTIFOCAL LENGTH COLLECTOR

[75] Inventor: Emanuel Marom, Tel Aviv, Israel

[73] Assignee: Symbol Technologies, Inc., Bohemia, N.Y.

[21] Appl. No.: 187,033

[22] Filed: Jan. 27, 1994

[51] Int. Cl.$^6$ .................................................. G06K 7/10
[52] U.S. Cl. ........................................ 235/467; 235/472
[58] Field of Search ...................................... 235/467, 472

[56] References Cited

U.S. PATENT DOCUMENTS

| | | | |
|---|---|---|---|
| 4,251,798 | 2/1981 | Swartz et al. | 340/146.3 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,560,862 | 12/1985 | Eastman et al. | 235/467 |
| 4,760,248 | 7/1988 | Swartz et al. | 235/472 |
| 4,808,804 | 2/1989 | Krichever et al. | 235/462 |
| 4,896,026 | 1/1990 | Krichever et al. | 235/472 |
| 4,933,538 | 6/1990 | Heiman et al. | 235/462 |
| 4,962,980 | 10/1990 | Knowles | 235/467 |
| 5,015,833 | 5/1991 | Shepard et al. | 235/472 |
| 5,080,456 | 1/1992 | Katz et al. | 359/462 |
| 5,136,147 | 8/1992 | Metlitsky et al. | 235/472 |
| 5,140,144 | 8/1992 | Shepard et al. | 235/472 |
| 5,151,580 | 9/1992 | Metlitsky et al. | 235/467 |
| 5,198,648 | 3/1993 | Hibbard | 235/462 |
| 5,202,784 | 4/1993 | Reddersen | 359/196 |
| 5,210,398 | 5/1993 | Metlitsky | 235/472 |
| 5,280,164 | 1/1994 | Barkan | 235/467 |
| 5,302,812 | 4/1994 | Li et al. | 235/467 |
| 5,315,095 | 5/1994 | Marom et al. | 235/462 |
| 5,331,143 | 7/1994 | Marom et al. | 235/472 |
| 5,340,982 | 8/1994 | Nakazawa | 235/467 |

FOREIGN PATENT DOCUMENTS 1-48017  2/1989  Japan .

*Primary Examiner*—F. L. Evans
*Attorney, Agent, or Firm*—Finnegan, Henderson, Farabow, Garrett & Dunner

[57] ABSTRACT

An optical system for use in a scanning system for reading symbols. The scanning system includes a head for containing the optical system. The optical system comprises a light source for generating a beam of light. A scanner is provided for directing the beam of light towards the symbol and scanning the beam of light across the symbol. Further, in accordance with the present invention, a dead zone-reducing optical system is provided in the head for lengthening the optical path length between the light source and the scanner to reduce the length of the dead zone exterior of the head. A collector collects light reflected from the symbol and directs it to a detector. The collector includes at least two sectors each having different focal lengths. The detector detects the variable intensity of the returning portion of the reflected laser light over a field of view, and generates an electrical signal indicative of the detected variable light intensity.

7 Claims, 2 Drawing Sheets

BARCODE SCANNER HAVING A DEAD ZONE REDUCING SYSTEM AND A MULTIFOCAL LENGTH COLLECTOR

BACKGROUND OF THE INVENTION

A. Field of the Invention

This invention relates to scanning systems which read indicia, for example, barcode symbols, having portions with different light reflectivities and, in particular to optical systems useful in such scanning systems.

B. Description of Related Art

Various optical readers and optical scanning systems have previously been developed for reading barcode symbols appearing on a label or on the surface of an article. The barcode symbol itself is a coded pattern of indicia. Generally, scanning systems electro-optically transform the graphic indicia of the symbols into electrical signals which are decoded into alphanumeric characters. The resulting characters describe the article or some characteristic of the article to which the symbol is attached. Such characters typically comprise input data to a data processing system for applications in point-of-sale processing, inventory control, and the like.

As used in this specification and in the appended claims, the terms "symbol," "barcode," and "barcode symbol" are used to denote a pattern of variable-width bars separated by variable-width spaces. The foregoing terms are intended to be broadly construed to cover many specific forms of one- and two-dimensional patterns, including alphanumeric characters as well as bars and spaces.

The specific arrangement of bars or elements in a symbol defines the character represented according to a set of rules and definitions specified by the code. This is called the "symbology" of the code. The relative size of the bars and spaces is determined by the type of code used, as is the actual size of the bars and spaces. The number of characters per inch represented by the barcode symbol is referred to as the density of the symbol.

To encode a desired sequence of characters, a collection of element arrangements are concatenated to form the complete symbol, with each character being represented by its own corresponding group of elements. In some symbologies, a unique "start" and "stop" character is used to indicate where the barcode symbol begins and ends. A number of different barcode symbologies presently exist. These symbologies include one-dimensional codes such as UPC/EAN, Code 39, Code 128, Codabar, Interleaved 2 of 5, and PDF 417.

Scanning systems have been disclosed, for example, in U.S. Pat. Nos. 4,251,798; 4,369,361; 4,387,297; 4,409,470; 4,760,248; 4,896,026; 4,808,804; and 4,933,538, all of which have been assigned to the assignee of the present invention and which are incorporated herein by reference. As disclosed in some of the above patents, and particularly in U.S. Pat. No. 4,409,470, one existing scanning system comprises a hand-held, portable laser scanning head. The hand-held scanning system is configured to allow a user to manually aim a light beam emanating from the head at a target symbol.

These scanning systems generally include a light source consisting of a gas laser or semiconductor laser. The use of semiconductor devices as the light source in scanning systems is especially desirable because of their small size, low cost and low power requirements. The laser beam is optically manipulated, typically by a focusing optical assembly, to form a beam spot having a certain size at a predetermined optimally located plane comprising the focal plane of the laser beam. Preferably, the cross section of the beam spot at the symbol location approximates the minimum width between symbol regions of different light reflectivity, i.e., the bars and spaces.

In conventional scanning systems, the light beam is repetitively scanned in a line or a series of lines across the symbol by moving a scanning component such as a mirror in the path of the light beam. The scanning component may sweep the beam spot across the symbol, trace a scan line across and beyond the boundaries of the symbol, or scan a predetermined field of view.

The particular location of the symbol depends upon the application of the scanning system. For example, where inventory is to be taken in a warehouse, the operator of the scanning system may be situated a great distance from the object being scanned. In such an application, it is desirable that the optimally located plane be located a great distance from the head of the scanning system. Conversely, in a scanning system used in point-of-sale applications, such as a cash register in a grocery store, it is desirable that the optimally located plane be located immediately outside of the head of the scanning system.

Scanning systems also include a collecting mirror for "collecting" light reflected or scattered from the symbol and directing it to a sensor or photodetector which detects the "collected" light. The photodetector or sensor is positioned in the scanner along an optical path so that it has a field of view which extends at least across and slightly beyond the lateral boundaries of the symbol. A portion of the light beam reflected from the symbol is detected by the photodetector and converted into an electrical signal.

The electrical signal produced by the photodetector is typically converted by a digitizer circuit in the scanner into a pulse-width modulated digital signal having widths corresponding to the physical widths of the symbol elements. The pulse-width modulated digitized signal from the digitizer is decoded, based upon the specific symbology used for the symbol, into a binary data representation of the data encoded in the symbol. The binary data may then be subsequently decoded into the alphanumeric characters represented by the symbol.

A problem arises in the type of systems in which the optimally located plane is located immediately outside of the head of the scanning system. The problem is the occurrence of a so-called "dead zone," which is a region of the scanning beam which is non-decodable.

Thus, in the dead zone, the beam spot to be swept across the symbol is not reliable for scanning. It is desirable to minimize the dead zone and enable even the untrained operator to manipulate the hand-held scanning head properly without reducing the working range or reducing power.

Moreover, the collecting mirror typically used in scanning systems is spherical and has a single focal length. While such collecting mirrors have proven useful, their depth of field is relatively shallow. That is, the "working range," or distance on either side of the optimally located plane at which accurate reading of a symbol can be accomplished, is narrow. Accordingly, it is also desirable to increase the depth of field of presently available laser scanning systems.

SUMMARY OF THE INVENTION

Accordingly, it is a goal of the present invention to provide a scanning apparatus having a relatively small dead zone.

Another goal of the present invention is to increase the depth of field or working range of presently available laser scanning systems.

These and other goals may be achieved by using an optical system useful in a scanning system for reading symbols in accordance with the present invention. The scanning system includes a head for containing the optical system. The optical system comprises a light source for generating a beam of light. A scanner is provided for directing the beam of light towards the symbol and scanning the beam of light across the symbol. Further, in accordance with the present invention, a dead zone-reducing optical system is provided in the head for lengthening the optical path length between the light source and the window of the scanner to reduce the length of the dead zone exterior of the head. A collector collects light reflected from the symbol and directs it to a detector. The detector detects the variable intensity of the returning portion of the reflected laser light over a field of view, and generates an electrical signal indicative of the detected variable light intensity.

In another aspect of the present invention, an optical system is provided for use in a scanning system for reading symbols. The scanning system includes a head for containing the optical system. The optical system comprises a light source for generating a beam of light. A scanner is provided for directing the beam of light towards the symbol and scanning the beam of light across the symbol. A collector collects light reflected from the symbol and directs it to a detector. The collector includes at least two sectors each having different focal lengths. The detector detects the variable intensity of the returning portion of the reflected laser light over a field of view and generates an electrical signal indicative of the detected variable light intensity.

Both the foregoing general description and the following detailed description are exemplary and explanatory, and are not restrictive of the invention as claimed. The accompanying drawings, which are incorporated in and constitute a part of the specification, illustrate embodiments of the present invention and together with the general description, serve to explain the principles of the present invention.

DESCRIPTION OF THE PREFERRED EMBODIMENTS

Figure 1:
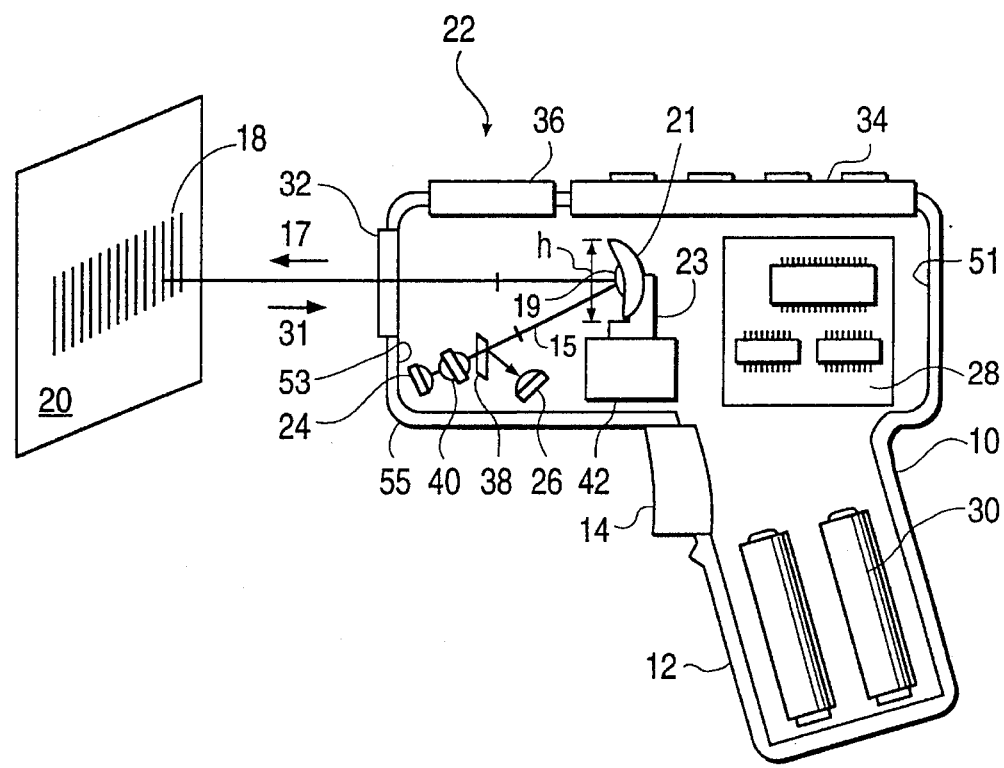
FIG. 1 illustrates an embodiment of a scanning system in accordance with the present invention.
Figure 2:
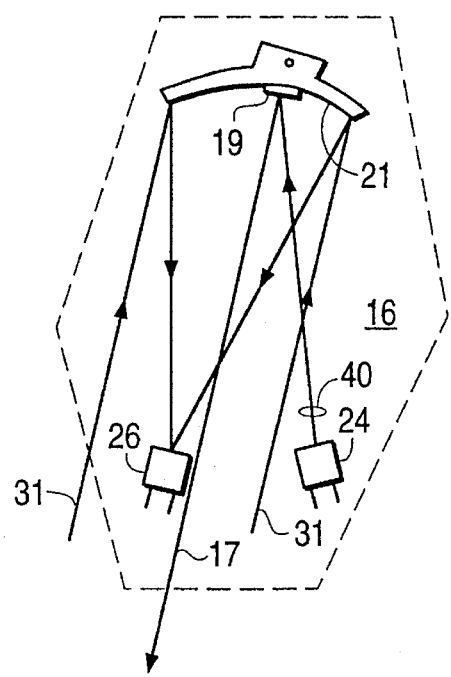
FIG. 2 is a plan view of an embodiment of an optical system for use in a scanning system of the present invention.

FIGS. 1 and 2 illustrate a typical embodiment of a hand-held scanning system known in the prior art, and will be referred to below to identify those components common to the preferred embodiments of the present invention. A scanning system is provided that includes a case 10, preferably of a lightweight plastic material, having a pistol-grip type handle 12. The scanning system includes a movable, manually-actuated trigger switch 14 which allows a user to activate a light source 24 to generate a light beam. Light source 24 is typically activated after the user has positioned the scanning system to point at a symbol 18 disposed in an optimally located plane 20.

At least a portion of case 10 comprises a head 22. Head 22 includes light source 24, detector 26, and various optical elements, which are further discussed below. Moreover, case 10 contains signal processing circuitry 28, and power source or battery 30.

While FIG. 1 shows a scanning system embodied as a hand-held scanning system, it need not be. For example, a scanning system in accordance with the present invention can be embodied as a desktop, stand-alone scanning system in which the symbol is passed underneath or over a window or port through which the outgoing beam is directed. Although such a scanning system itself is stationary during scanning, the symbol is moved relative to the workstation and is registered with the outgoing beam.

Case 10 may also contain various electrical subcircuits mounted on board 28. For example, signal processing means on board 28 are operative for processing the electrical signal generated by the detector 26, and for generating a digitized signal. Data descriptive of the symbol can be derived from the signal. Suitable signal processing means for this purpose is described in U.S. Pat. No. 4,251,798. Board 28 may, for example, include drive circuitry for the scanner motor 42, and suitable motor drive circuitry for this purpose is described in U.S. Pat. No. 4,387,297. Board 28 may also include a voltage converter for converting the incoming voltage to one suitable for energizing light source 24. U.S. Pat. Nos. 4,251,798 and 4,387,297 are incorporated herein by reference and made part of the instant application.

A light-transmissive window 32 in the front end of housing 22 allows an outgoing light beam 17 to exit, and an incoming reflected light beam 31 to enter. Scanning system 10 is designed to be aimed at barcode symbol 18 by a user or operator. Scanning system 10 may be moved laterally relative to symbol 18, that is, in a direction across symbol 18. Typically, this type of hand-held scanning system 10 operates at a distance greater than several inches from symbol 18. Some applications, however, such as in warehouse inventory control, require scanning system 10 to operate at a much greater range from barcode symbol 18, possibly 10–30 feet or more.

Scanning system 10 may also function as a portable computer terminal, and in such embodiments includes a keyboard 34 and a display 36, such as described in the previously noted U.S. Pat. No. 4,409,470, which is incorporated herein by reference.

As further depicted in FIG. 1, light source 24 is positioned to generate a light beam along an optical axis 15 of a lens 40, and the beam passes through a beam splitter 38, the structure and function of which is described below, and other lenses or beam-shaping structure, as needed. Light source 24 is preferably a laser. It may be a gas laser but, preferably, is a semiconductor laser diode. Lens 40 focuses the light beam emanating from light source 24 into a scanning spot in plane 20 in which barcode symbol 18 is situated.

The beam emanating from light source 24 is reflected from a scanning mirror 19, scanning mirror 19 being coupled to a scanning motor 42. Scanning motor 42 may be energized when trigger 14 is activated. Scanning motor 42 is preferably of the type shown and described in U.S. Pat. No. 4,387,397, the contents of that patent being incorporated herein by reference. Scanning mirror 19 is preferably coupled to scanning motor 42 through a support bracket 23. Scanning motor 42 is driven to reciprocally and repetitively oscillate scanning mirror 19 in alternate circumferential directions over arc lengths of any desired range, but typically less than 90°.

In one embodiment of the present invention, scanning mirror 19 is oscillated to repetitively sweep the laser beam emanating from light source 24 through an angular distance or arc length at the reference plane of about 20° and at a rate of about 20 scans or 40 oscillations per second.

If the light produced by light source 24 is only marginally visible, an aiming light may be included in the optical system. The aiming light, if needed, produces a visible-light spot which may be fixed, or it may be scanned just like the light beam emanating from light source 24. The user employs this visible light beam to aim the scanning system at symbol 18 before pulling trigger 14.

The scanning mirror 19 reflects the light beam emanating from light source 24 through the forwardly-facing, laser-light-transmissive window 32 and onto symbol 18. This light beam reflected by the scanning mirror comprises outgoing light beam 17. As indicated above, lens 40 focuses the beam of light emanating from light source 24 as a spot on symbol 18. Alternatively, lens 40 may be embodied as an axicon optical device or an axicon-lens combination. An axicon optical device is an optical device that can be implemented as a lens, focussing mirror, holographic optical element, or the like, which images a point source of light emanating from light source 24 as a line along the axis traversed by outgoing light beam 17.

Oscillating scanning mirror 19 sweeps the laser beam across all the bars of symbol 18 so that a linear scan is generated. The linear scan can be located anywhere along the height of the bars of symbol 18, provided that all the bars are swept. The length of the linear scan should be longer than the length of the longest symbol expected to be read at plane 20.

Plane 20 is located outside of head 22, thus, outside of window 32. Plane 20 may be immediately exterior of window 32, to the extent of being in contact with window 32, or at some distance from the head for reading symbols out of contact with the head. Plane 20 preferably lies generally perpendicular to the longitudinal direction along which the emitted laser beam propagates. A symbol 18 to be read is preferably located in the vicinity of plane 20. Plane 20, and, therefore, symbol 18, is located within the depth of field of the outgoing light beam 17 focused by lens 40.

A beam splitter 38 may be provided, as shown in FIG. 1, to direct incoming reflected light beam 31 along a common optical path 15 toward detector 26. The term "common optical path" refers to an optical path along which both incoming reflected light beam 31 and outgoing light beam 17 travel. Beam splitter 38 may be embodied, for example, as a partially silvered mirror. By providing such a common optical path the size of the optical system to be contained in head 22 can be reduced, thus reducing the overall size of head 22.

FIG. 2 shows an optical assembly suitable for use in head 22 mounted on a thin, flexible, printed circuit board 16 and positioned for optically modifying and directing a laser beam emitted from light source 24 along an optical path traversed by outgoing light beam 17 toward plane 20 located external to the head. The embodiment of FIG. 2, unlike that of FIG. 1, does not include a beam splitter 38. Rather, light emanating from light source 24, focussed and formed by lens 40, is reflected from scanning mirror 19 and propagates as outgoing light beam 17 toward plane 20. In the embodiment of FIG. 2, outgoing light beam 17 and incoming reflected light beam 31 do not have a common optical path at any point between light source 24, or detector 26, and collecting mirror 21 or scanning mirror 19. Both mirrors 19 and 21 are mounted on the same support to scan in unison, but they may be mounted separately and the collecting mirror 21 may be fixedly mounted and need not be scanned.

Referring again to FIG. 2, incoming reflected light beam 31 is collected by a collecting mirror 21. Collecting mirror 21 is, preferably, generally concave and spherical. Alternatively, collecting mirror 21 may be aspherical, elliptical, or any other suitable geometric shape. Incoming reflected light beam 31 is, generally, a broad conical beam of light expanding outward from the spot formed on symbol 18. The collecting mirror 21 reflects the collected light to detector 26, preferably a photodiode. Detector 26 detects the variable intensity of the collected laser light over a field of view which extends along, and preferably beyond, the linear scan, and generates an electrical signal indicative of the detected variable light intensity.

The scanning mirror and the collecting mirror may be of one-piece construction. The scanning mirror may also be a discrete, small, planar, front-surfaced mirror attached by glue, or molded in place, at the correct position and angle on a silvered concave mirror. Where collecting mirror 21 and scanning mirror 19 are of a one-piece construction, collecting mirror 21 may also be mounted to motor 42 through support bracket 23 and, when the scanning mirror is actuated by the trigger, the collecting mirror is reciprocally and repetitively oscillated transversely, sweeping the field of view of the photodiode lengthwise across the symbol in a linear scan.

An example of a scanning mirror discrete from the collecting mirror is a system in which the collecting mirror is mounted in a fixed, non-scanning position and only the scanning mirror is coupled to scanning motor 42.

Scanners in which the scanning mirror and the collecting mirror are mounted together are considered to be of the retro-reflective type. The retroreflective principle calls for a scanning or oscillating mirror to be used both for directing a beam out as the outgoing light beam 17, as well as for collecting the scattered radiation included in the incoming reflected light beam 31. In common scanners, the scanning mirror is flat while the collecting mirror is optimized for a given range of expected barcode location.

Axicon-formed scanning beams, that is beams of light formed by optical devices that image a point source as an axial line, exhibit an extended working range, which is the usable scanning region in which the beam diameter is small and spreads only very little. However, such beams have a relatively long dead zone.

Reducing the dead zone may be achieved in several ways. The dead zone may be decreased by decreasing the aperture size of the optics in the scanning system. Alternatively, collecting mirror 21 may be situated adjacent the rear wall 51 of case 10, and well back of front wall 53. Also, the scanner and collector inside head 22 may be positioned so that the optical path along which outgoing light beam 17 travels is inclined at a slight acute angle, on the order of 30° relative to the horizontal. Similarly, front wall 53 may be designed to form an acute angle relative to a bottom wall 55 to force the user to hold head 22 at other than a right angle relative to reference plane 20, and particularly so when head 22 is placed in contact with symbol 18.

While the foregoing approaches do reduce the dead zone, they may, however, also reduce the working range of a scanning system, in particular where excessively small beam cross sections are required. Moreover, the foregoing approaches may require a larger head 22 to accommodate the optics of the scanning system. This is particularly disadvantageous in hand-held scanning systems. Even applying the foregoing approaches, however, may result in a dead zone that is still be too long.

Instead, in accordance with the present invention, a dead zone-reducing optical system is provided in the head for lengthening the optical path length between the light source and the scanner to reduce the length of the dead zone outside of the head. One embodiment of such a dead zone-reducing optical system is one in which the light beam emanating from light source 24 is folded inside the head before exiting it. Thus, one can achieve large depth of focus with negligible dead zone, since most of the dead zone is folded inside head 22 before it reaches exit window 32.

Figure 3:
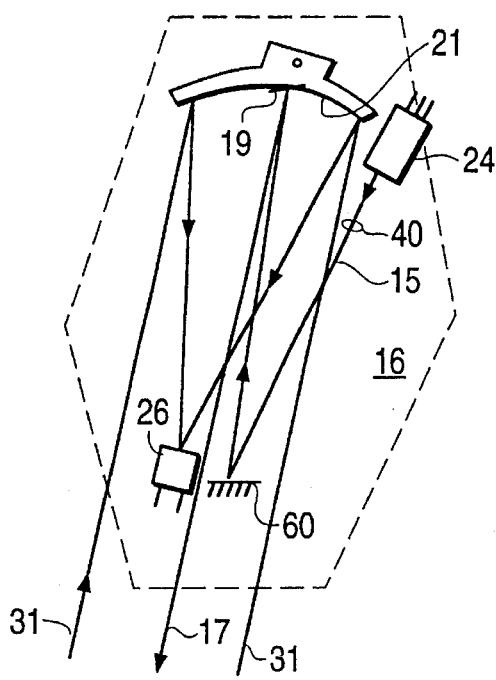
FIG. 3 is a plan view of an embodiment of an optical system for use in a scanning system in accordance with the present invention.
Figure 4:
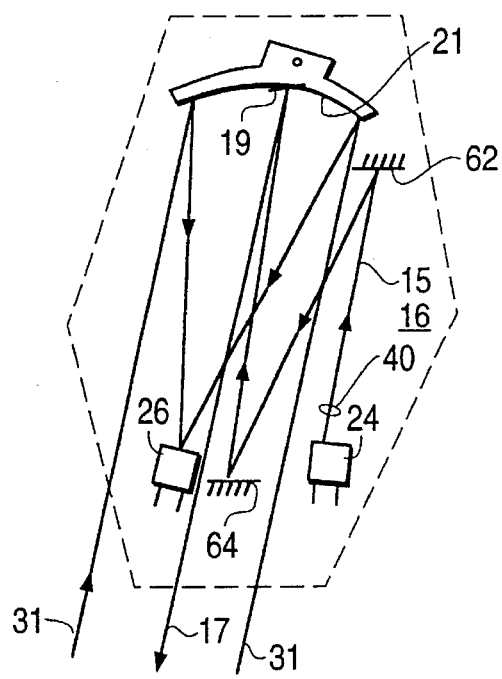
FIG. 4 is a plan view of an embodiment of a optical system for use in a scanning system in accordance with the present invention.

FIGS. 3 and 4 show a dead zone-reducing optical system in accordance with the present invention which is practical for incorporation in existing scanners or scanners that may be subsequently developed. FIG. 3 shows an optical system in accordance with the present invention in which the optical path is folded once. As described above in reference to FIGS. 1 and 2, a laser light beam emanating from light source 24 passes through lens 40 and is reflected by a fold mirror 60 before propagating to scanning mirror 19. In this way, the length of the optical path traversed by a light beam emanating from light source 24 inside head 22 is substantially doubled. Thus, any dead zone that may have extended outside of window 32 absent fold mirror 60 is contained entirely or substantially within head 22.

In some applications, it may be necessary to fold the beam emanating from light source 24 more than once to ensure that the dead zone does not extend past window 32. Accordingly, FIG. 4 shows another embodiment of the present invention including a pair of fold mirrors 62 and 64. By using a pair of fold mirrors 62 and 64, the laser light beam emanating from light source 24 passes through lens 40 and is folded twice, first by fold mirror 62 and, second by fold mirror 64, before propagating to scanning mirror 19. In this way, the length of the optical path traversed by light beam emanating from light source 24 inside head 22 is substantially tripled. Thus, any dead zone that may have extended outside of window 32 absent fold mirrors 62 and 64 is contained entirely or substantially within head 22.

It should be understood that while FIG. 3 shows an embodiment of the present invention using one fold mirror 60 and the embodiment of FIG. 4 uses a pair of fold mirrors 62 and 64, a scanning system in accordance with the present invention may use three or more fold mirrors. The number of fold mirrors to be used depends upon the specific application and, particularly, the need to increase the path length of the beam emanating from light source 24 to ensure that the dead zone is located entirely within head 22 or extends past window 32 only by a desired amount. Of course one should minimize the number of fold mirrors, to ease alignment and fabrication and minimize losses also.

Moreover, fold mirrors 60 (as shown in FIG. 3) and 62 and 64 (as shown in FIG. 4) need not be disposed all in one plane, or in the exact configurations as shown in the figures. For instance, in embodiments of the present invention employing more than one fold mirror, the multiple fold mirrors may be oriented such that the legs of the folded beam paths are at or nearly parallel to each other. In such embodiments, the beam may travel past a fold mirror either beyond the edge thereof or through a hole in one of the fold mirrors before exiting through window 32. Similarly, the beam may traverse a hole in the scanning mirror so that fold mirrors can be positioned both behind and in front of the scanning mirror.

Figure 5:
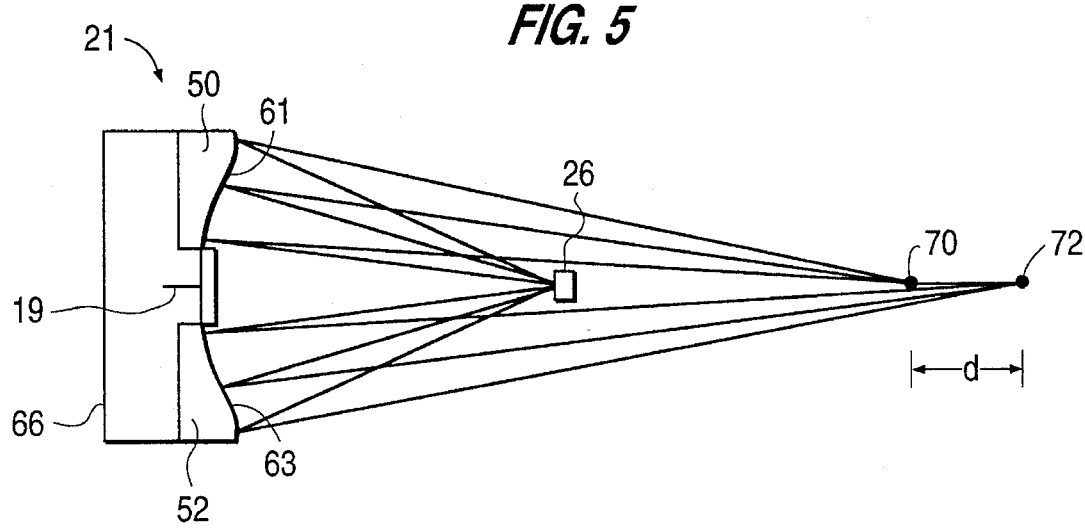
FIG. 5 is a plan view of a collecting mirror for use in a scanning system in accordance with the present invention.

In accordance with another aspect of the present invention, collecting mirror 21 preferably includes two or more sections. The curvature of each section is picked so that each will focus incoming light beam 17 at a different distance. FIG. 5 shows one embodiment of the present invention in which a collector mirror 21 is provided that includes two sectors 50 and 52 mounted on base 66.

Each of sectors 50 and 52 has a different focal length. FIG. 5 shows the collecting mirror 21 of FIG. 5 including sectors 50 and 52 having reflective focussing surfaces 61 and 63, respectively. Light from a first spot 70 is reflected by reflecting focussing surface 61 to detector 26. Light from a second spot 72, located further from head 22, is reflected by reflecting focussing surface 63 to detector 26. Thus, the depth of field or working distance, designated "d," in FIG. 5, is increased over collecting mirrors having a single focal length reflecting surface.

In an optical system in accordance with the present invention, head 22 need not be maintained a precise distance away from plane 20. Rather, provided that plane 20 falls somewhere within working distance "d" an accurate reading of symbol 18 may be obtained. Thus, in embodiments where scanning system 10 is a hand-held device, the user may move head 22 within a range "d" of reference plane 20 and still obtain an accurate reading. Similarly, in an embodiment where scanning system 10 is fixed, the object including the symbol 18 to be scanned may be moved within a range "d" of the scanning system 10.

The present invention provides a scanning system capable of eliminating or minimizing the dead zone associated with previous systems. In addition, the present invention provides a scanning system capable of increasing the depth of field associated with previous systems. As a result, the scanning system of the present invention offers improved performance in a variety of applications, including those in which the reference plane is immediately adjacent the head 22, or some distance away. Moreover, a scanning system in accordance with the present invention is more flexible and easier to use than known systems.

It will be apparent to those 11ed in the art that various modifications and variations can be made in the scanning system of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical system for use in a scanning system for reading symbols, the scanning system including a head for containing the optical system, the optical system comprising:

a light source for generating a scanning beam of light;

a scanner for scanning the beam of light across the symbol;

a dead zone-reducing optical system in the head for lengthening the optical path length between said light source and said scanner, the amount of said lengthening being sufficient to substantially reduce the length of the dead zone exterior of the head by bringing the scanning beam to a focus closely adjacent to and immediately exterior of the head; and a collector for collecting light reflected from the symbol and directing it to a detector.

2. An optical system for use in a scanning system for reading symbols as claimed in claim 1 wherein said dead zone-reducing optical system includes at least one fold mirror between said light source and said scanner.

3. An optical system for use in a scanning system for reading symbols as claimed in claim 1 wherein said dead zone-reducing optical system includes two fold mirrors between said light source and said scanner.

4. An optical system for use in a scanning system for reading symbols, the scanning system including a head for containing the optical system, the optical system comprising:

a light source for generating a scanning beam of light;

a scanner for directing the beam of light towards the symbol and scanning the beam of light across the symbol;

a collector for collecting light reflected from the symbol and directing it to a detector, the collector having different focal lengths; and a dead zone-reducing optical system in the head for lengthening the optical path length between said light source and said scanner to substantially reduce the length of the dead zone exterior to the head by bringing the scanning beam to a focus closely adjacent to and immediately exterior to the head.

5. The optical system as claimed in claim 4 where said collector is a mirror.

6. The optical system as claimed in claim 4 wherein said scanner is a planar mirror mounted on said collector.

7. The optical system as claimed in claim 4 wherein said scanner is a planar mirror mounted separate from said collector.

* * * * *